US008799179B2

(12) United States Patent
Amato

(10) Patent No.: US 8,799,179 B2
(45) Date of Patent: *Aug. 5, 2014

(54) SYSTEM, METHOD, AND ARTICLE OF MANUFACTURE FOR FILTERING MAIL ITEMS BASED UPON RECIPIENT PREFERENCE

(75) Inventor: Michael J. Amato, Reston, VA (US)

(73) Assignee: United States Postal Service, Washington, DC (US)

( * ) Notice: Subject to any disclaimer, the term of this patent is extended or adjusted under 35 U.S.C. 154(b) by 1270 days.

This patent is subject to a terminal disclaimer.

(21) Appl. No.: 10/474,251

(22) PCT Filed: Apr. 9, 2002

(86) PCT No.: PCT/US02/11061
§ 371 (c)(1),
(2), (4) Date: Oct. 8, 2003

(87) PCT Pub. No.: WO02/088226
PCT Pub. Date: Oct. 17, 2002

(65) Prior Publication Data
US 2004/0117326 A1    Jun. 17, 2004

Related U.S. Application Data

(60) Provisional application No. 60/282,144, filed on Apr. 9, 2001.

(51) Int. Cl.
*G06Q 30/00* (2012.01)
(52) U.S. Cl.
USPC ............................ 705/332; 705/337; 705/338
(58) Field of Classification Search
USPC ........................ 705/401–411, 332, 337–338
See application file for complete search history.

(56) References Cited

U.S. PATENT DOCUMENTS 4,632,252 A * 12/1986 Haruki et al.
4,800,506 A *  1/1989 Axelrod et al. ............... 700/227
(Continued)

FOREIGN PATENT DOCUMENTS

EP        1063602 A1   12/2000
JP        63-294156    11/1988
(Continued)

OTHER PUBLICATIONS

Carroll, J. "E-mail Message Filtering Software Set to Explode. (E-Mail) (Column)", Computing Canada, vol. 19, No. 16, pp. 46(1), pp. 1-3, (Aug. 3, 1993).

(Continued)

*Primary Examiner* — Tonya Joseph
(74) *Attorney, Agent, or Firm* — Finnegan, Henderson, Farabow, Garrett & Dunner LLP

(57) ABSTRACT

Methods and systems are provided for filtering of a mail item addressed to a recipient. In accordance with an embodiment, preference information about mail items from the recipient is obtained. The preference information is compared with information on the mail item and based on the comparison, it is determined whether the mail item should be delivered. The preference information may include at least one of a size of the mail items, a type of the mail items, a classification of the mail items, a weight of the mail items, and preference information abut senders. In accordance with another embodiment, the preference information of a recipient may be provided to a sender so that the sender can determine whether the recipient wants mail items from the sender.

44 Claims, 8 Drawing Sheets

(56) References Cited

U.S. PATENT DOCUMENTS

| | | | |
|---|---|---|---|
| 5,308,932 A * | 5/1994 | Manduley et al. | 177/25.15 |
| 5,422,821 A * | 6/1995 | Allen et al. | 700/219 |
| 5,563,947 A * | 10/1996 | Kikinis | 705/51 |
| 5,619,648 A | 4/1997 | Canale et al. | |
| 6,052,709 A * | 4/2000 | Paul | |
| 6,189,223 B1 | 2/2001 | Haug | |
| 6,216,122 B1 | 4/2001 | Elson | |
| 6,285,777 B2 | 9/2001 | Kanevsky et al. | |
| 6,292,709 B1 * | 9/2001 | Uhl et al. | 700/226 |
| 6,459,953 B1 | 10/2002 | Connelly et al. | |
| 6,650,739 B1 * | 11/2003 | Doeberl et al. | 379/88.18 |
| 6,690,773 B1 * | 2/2004 | Law | 379/88.22 |
| 2001/0049624 A1 * | 12/2001 | Uyama et al. | |
| 2002/0032623 A1 | 3/2002 | Wheeler et al. | |
| 2002/0095306 A1 | 7/2002 | Smith et al. | |
| 2002/0120600 A1 | 8/2002 | Schiavone et al. | |
| 2002/0120702 A1 | 8/2002 | Schiavone et al. | |
| 2002/0131561 A1 | 9/2002 | Gifford et al. | |
| 2002/0143428 A1 * | 10/2002 | Sansone | 700/215 |
| 2002/0143430 A1 | 10/2002 | Sansone et al. | |
| 2003/0167244 A1 * | 9/2003 | Rasmussen et al. | 705/414 |
| 2004/0139033 A1 | 7/2004 | Amato | |

FOREIGN PATENT DOCUMENTS

| | | | |
|---|---|---|---|
| JP | 63294156 A * | 11/1988 | |
| JP | 10-307876 | 11/1998 | |
| WO | WO 98/37680 | 8/1998 | |
| WO | WO 99/21330 | 4/1999 | |

OTHER PUBLICATIONS

Newsbytes News Network, "Internet Expo—Pronto Mobile & 'Secure' E-Mail (CommTouch Software's New E-mail Client for Portable PC Users, Pronto Mobile, Provides Time-Saving New 'Scenarios')", Newsbytes News Network, pp. 1-3, (Dec. 4, 1995).

International Search Report for PCT US/02/011061, May 1, 2003.

Office Action issued in co-pending U.S. Appl. No. 10/474,435 on May 18, 2007 (14 pages).

Final Office Action issued in co-pending U.S. Appl. No. 10/474,435 on Feb. 11, 2008 (15 pages).

Office Action issued in co-pending U.S. Appl. No. 10/474,435 on Jun. 24, 2008 (16 pages).

Office Action issued in co-pending U.S. Appl. No. 10/474,435 on Jan. 12, 2009 (9 pages).

Final Office Action issued in co-pending U.S. Appl. No. 10/474,435 on Sep. 2, 2009 (9 pages).

Office Action issued in co-pending U.S. Appl. No. 10/474,435 on Feb. 23, 2010 (13 pages).

Office Action issued in co-pending U.S. Appl. No. 10/474,435 on Jul. 20, 2010 (10 pages).

* cited by examiner

SYSTEM, METHOD, AND ARTICLE OF MANUFACTURE FOR FILTERING MAIL ITEMS BASED UPON RECIPIENT PREFERENCE

RELATED APPLICATIONS

This application claims the benefit of U.S. Provisional Patent Application No. 60/282,144, filed Apr. 9, 2001, the content of which is hereby incorporated in its entirety by reference.

BACKGROUND

1. Technical Field

The present invention relates generally to controlling mail items that are sent to a recipient and, more particularly, to a system, method, and article of manufacture for filtering out mail items that a recipient may not want to receive.

2. Background Information

Over the years, individuals and businesses have become increasingly dependent on delivery services, like the United States Postal Service ("USPS"), to deliver mail items, such as letters and packages, to others. For example, a business may periodically send advertising and marketing material to current and potential customers through a delivery service. As a result, the amount of mail items that a recipient, such as an individual or a business, may receive has increased. A recipient, however, may not like some of the mail items and may not want to receive some of these items in the future for several reasons. One reason is that the recipient may not want to waste time culling through all the received mail items and throwing away the items that the recipient does not want.

In addition to the time problem, the recipient of a mail item may not want a particular item delivered to them. For example, when a recipient receives a mail item that includes advertising material, the recipient may just discard it. Moreover, in certain cases, where the recipient may be able to tell that a mail item includes certain type of material or object, the recipient may discard the item without even opening it. For example, a recipient may take a look at the bulk rate stamp or bulk rate payment indicator on a mail item and know that the mail item includes material or an object that the recipient does not want and thus, may just discard it without even opening it.

In addition, unwanted mail items, such as bulk mail, may cause problems by filling up the limited space in a recipient's mailbox. For example, if a recipient has a small post office box or apartment-style mailbox that may be six inches by four inches by ten inches deep, unwanted mail items may stuff that box to the brim every other day. The problem may be worse when the recipient goes on vacation and when no one may empty the mailbox for several days. Moreover, the unwanted mail items may crumple and tear wanted mail items. As a result of the foregoing reasons, recipients may not want all the mail items intended for them.

One solution to the problem of unwanted mail items is for a recipient to throw away the mail items that the recipient does not want. Another solution is for a recipient to notify the sender of the mail item that the recipient does not wish to receive any mail item or a mail item that includes certain materials or objects from the sender. Both of these solutions require the recipient to invest time that the recipient could use for other tasks. Moreover, the latter solution may work only if the recipient opens the mail item and possibly finds a telephone number within to call and notify the sender that he does not wish to receive certain or any mail items from the sender. Of course, this solution may only work if the sender included a feedback phone number in the mail item.

In addition to wasting a recipient's resources, a sender may be wasting its own resources, such as printing and shipping costs, by sending unwanted mail items to a recipient. The sender may be able to better utilize its resources by sending the mail item to a person who would actually use or read it, instead of immediately throwing it away. Currently, however, unless notified by the recipient, a sender may not know whether a recipient will throw away the mail item that the sender is sending to the recipient.

SUMMARY

To address the above and other problems of the prior art, methods and systems are provided for filtering of a mail item addressed to a recipient. Such methods and systems obtain preference information about mail items from the recipient; compare information on the mail item to the preference information; and determine whether to deliver the mail item based on the comparison. The preference information may include at least one of a size of the mail items, a type of the mail items, a classification of the mail items, a weight of the mail items, and preference information about senders.

In accordance with another aspect, systems and methods prevent a sender from sending a mail item to a recipient. Such systems and methods obtain preference information about mail items from the recipient and provide the preference information to the sender. A rational sender will not send a mail item to a recipient who does not want it.

Both the foregoing and the following description are exemplary and explanatory and are intended to provide further explanation of the claimed invention as opposed to limiting it in any manner.

DETAILED DESCRIPTION

The following detailed description refers to the accompanying drawings. While the description includes exemplar embodiments, other embodiments are possible and changes may be made to the embodiments described without departing from the spirit and scope of the invention. The following detailed description does not limit the invention. Instead, the appended claims and their equivalents define the scope of the invention.

Systems and methods are provided to filter out mail items that a recipient may not want to receive through a delivery service. In one embodiment, the recipient of a mail item may provide preference information, including a filter criteria, to a delivery service, such as the USPS. The filter criteria may be include a variety of information, including recipient's preference information about the types of mail items, such as a letter or a package; the classification of mail items, such as bulk-class mail items or first class mail items; the size of the mail items; and the weight of the mail items that a recipient may or may not want to receive. For example, the recipient may specify that the recipient does not want to receive bulk-class mail items. In addition, the filter criteria may include names of the senders from whom the recipient may or may not want to receive mail items.

After receiving the preference inflation, the delivery service may store it and then compare all mail items addressed to the recipient to this information, including the filter criteria. Then, based on the comparison, the delivery service may remove from the delivery stream all items that the recipient may not want to receive. For example, if the filter criteria indicates that a recipient does not want to receive bulk-class mail items, the delivery service may remove such mail items from the delivery stream so that such mail items are not delivered to the recipient. Moreover, the delivery service may return, dispose of, or save the removed mail items.

In another embodiment, the delivery service may provide all or part of the preference information of recipients to the senders. For example, the delivery service may inform a sender that a recipient does not want to receive certain mail items or any mail items from the sender. In still another embodiment, where the delivery service may have notified a sender that a recipient does not desire to receive a particular or any mail item from the sender, but the sender still sends the mail item to the recipient, the delivery service may filter out the mail item and thus, the mail item may not be delivered to the recipient.

Figure 1:
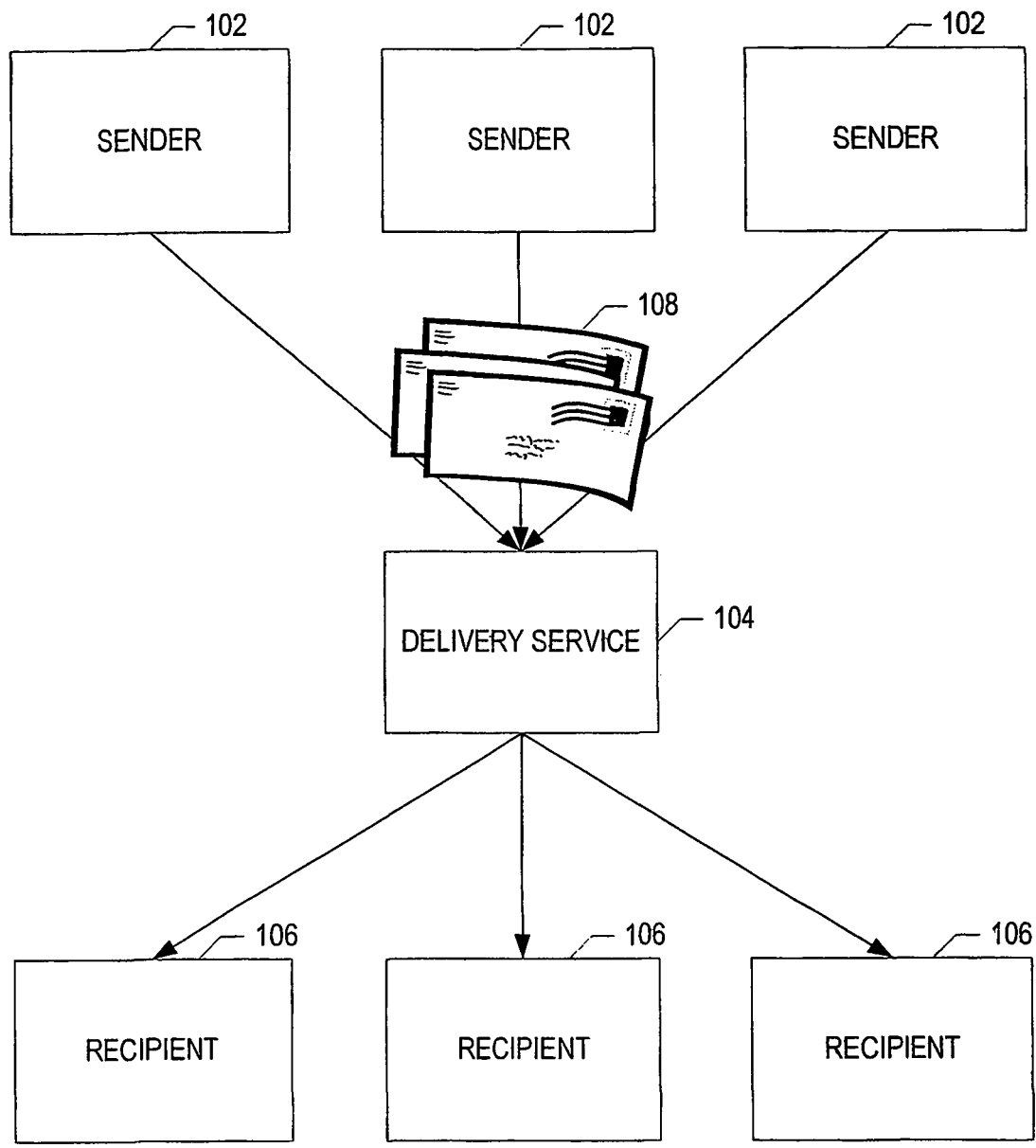
FIG. 1 is an exemplary block diagram of a delivery system illustrating the various entities and their relationships to each other, in accordance with methods and systems consistent with the present invention.

FIG. 1 is an exemplary block diagram of a delivery system illustrating the various entities and their relationships to each other, in accordance with methods and systems consistent with the present invention. As shown, a delivery system may include one or more senders 102, a delivery service 104, and one or more recipients 106. Senders 102 may send mail items 108, such as letters or packages, to recipients 106 via delivery service 104. Senders 102 and recipients 106 may include individuals or businesses. Delivery service 104 may include any service, such as the USPS and United Postal Service ("S"), that delivers mail items 108 to recipients 106. Mail items 108 may include letters, packages, magazines, and bulk mail items, etc. Although only one delivery service 104 is shown in FIG. 1, one skilled in the art will recognize that the delivery system may include more than one delivery service 104.

Delivery service 104 may have preference information about a recipient 106, including the recipient's preferences regarding mail items 108, and thus, may deliver mail items 108 to recipient 106 based on the recipient's preferences. The recipients 106 may receive the sent mail items 108 through a post office box, a mailbox located at their home or business, or thorough a representative of the delivery service 104.

Figure 2:
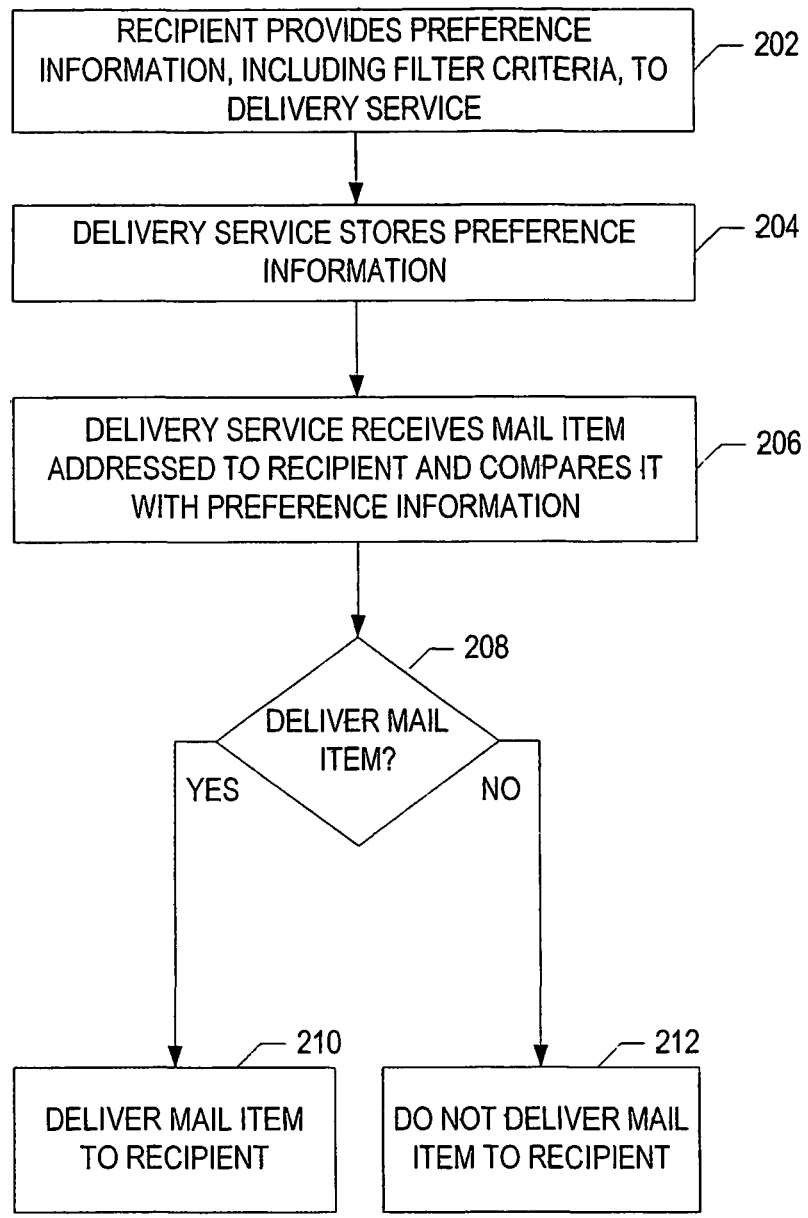
FIG. 2 is an exemplary flowchart illustrating the steps of a process for filtering mail items, in accordance with methods and systems consistent with the present invention.

FIG. 2 is an exemplary flowchart illustrating the steps of a process for filtering mail items, in accordance with methods and systems consistent with the present invention. As shown, recipient 106 may provide preference information, including a filter criteria and other information, to delivery service 104 (step 202). The filter criteria may include any information that helps delivery service 104 determine whether a recipient 106 wants to receive a certain mail item 108. For example, the filter criteria may include the recipient's preference information about the types of mail items; the classification of mail items; the size of the mail items; and the weight of the mail items that the recipient may or may not want to receive. In addition, the filter criteria may include names of the senders 102 from whom the recipient 106 may or may not want to receive mail items 108. In addition to the filter criteria, recipient 106 may provide other information, such as name, address, and salary information, to delivery service 104. The recipient 106 may provide this other information voluntarily or upon demand by delivery service 104.

Recipient 106 may provide the preference information to delivery service 104 through a printed form; through an online network, such as the Internet; through a telephone; or through any other means of communication. For example, a recipient 106 could provide the preference information by filling out a printed form and submitting it to a post office or by mailing the form to the post office. Moreover, the form that obtains the preference information may be incorporated with any of the existing forms of delivery service 104.

Once delivery service 104 receives the preference information including the filter criteria from a recipient 106, it may store this information manually or electronically (step 204). For example, delivery service 104 may store the information in a database on a computer.

After the preference information including the filter criteria has been stored, delivery service 104 may use this information whenever it receives mail items 108. Upon receiving a mail item 108 that is intended for a recipient 106, delivery service 104 may compare the information on the mail item 108 to the preference information, including the filter criteria (step 206). The comparison of the information on the mail item 108 to the preference information may be done manually or electronically. In one embodiment, a worker of delivery service 104 may manually compare mail items 108 against the recipient's preference information. In another embodiment, a sorting device may be used to compare the mail item 108 to the preference information. The sorting device may work with a database that includes the preference information to compare the mail item 108 to the preference information. In addition, the sorting device may include image recognition hardware and software to recognize the information on the mail item. In still another embodiment, the sorting device and a worker of the delivery service 104 may compare mail items 108 against the stored preference information for a recipient 106.

The comparison operation may occur at any point in the delivery process. However, greater efficiency may be obtained if the comparison operation is performed early in the delivery process to avoid processing items that will not be delivered.

Depending on the preference information, delivery service 104 may determine whether or not it can deliver the mail item 108 to its intended recipient (step 208). For example, if the mail item 108 is from a sender named "X" and the filter criteria for a recipient indicates that the recipient does not wish to receive any mail item from X, then delivery service 104 may not deliver the mail item 108 to that recipient.

If the deliver service 104 determines that the intended recipient 106 wants to receive a certain mail item 108 or if it determines that the intended recipient 106 has indicated no preference as to whether it wants to receive a certain mail item 108, delivery service 104 may deliver the mail item 108 to the recipient 106 (step 210). On the other hand, if the delivery service 104 determines that the intended recipient 106 does not want to receive mail item 108, then the deliver service may not deliver that mail item 108 to recipient 106 (step 212). Instead, the delivery service 104 may discard that mail item 108, return it to sender 102, or store it for delivery to the recipient 106 in the future. In one embodiment, delivery service 104 may prompt recipient 106 to determine what the delivery service 104 should do with unwanted mail items 108. For example, a recipient 106 may want the delivery service 104 to remove all unwanted mail items 108 and store them for pickup by recipient 106 at a later time.

Figure 3:
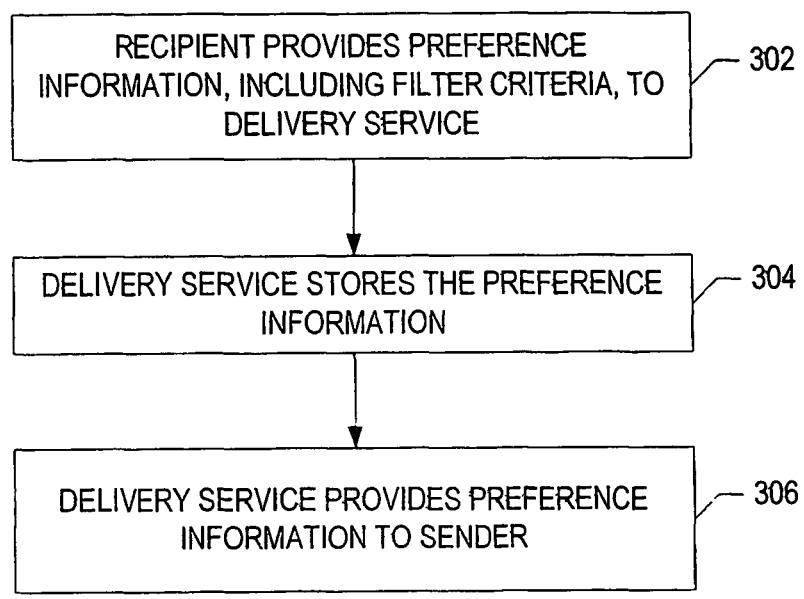
FIG. 3 is an exemplary flowchart illustrating the steps of a process for providing a sender with a recipient's preferences, in accordance with methods and systems consistent with the present invention.

Instead of filtering items itself, delivery service 104 may provide a recipient's preferences to sender 102 so that a sender 102 can decide whether or not to send a mail item 108 to a recipient 106. A rational sender 102 would not send a mail item 108 to a recipient 106 who has indicated that it does not want to receive any mail items 108 from the sender 102. FIG. 3 is an exemplary flowchart illustrating the steps of a process for providing a sender with a recipient's preferences, in accordance with methods and systems consistent with the present invention. Steps 302 and 304 of FIG. 3 are similar to steps 202 and 204 of FIG. 2 and are not described herein. After receiving and storing the preference information, delivery service 104 may provide all or part of the preference information for a recipient 106 to sender 102 electronically, such as through the Internet, or manually, such as through the mail (step 306).

Delivery service 104 may provide the preference information to selective senders 102 or to all senders 102. For example, the preference information may be supplied only to senders 102 who have sent mail items 108 to recipients 106 in the past.

The preference information, including the filter criteria, could be very valuable to senders 102. For example, just as the filter criteria may identify recipients who do not want certain mail items 108, it may also identify recipients that do, or at least who have not said that they do not want to receive certain mail items 108. Thus, delivery service 104 may also provide a list of recipients 106 who do want certain mail items 108 to senders 102, or the senders 102 may generate such a list from the preference information provided to them by delivery service 104.

In addition, using the preference information, senders 102 may increase the chances of a recipient receiving and opening their mail item 108. For example, senders 102 may solicit recipients 106 who have indicated that they do not want to receive mail items 108 that have a certain classification, such as bulk-class mail items, by using the preference information to generate first-class mail items instead of bulk-class mail item to those recipients, thus increasing the chances of a recipient 106 opening the mail item 108.

As indicated in the foregoing description, delivery service 104 may provide some or all of the recipient preference information to senders 102. In one embodiment, where the senders 102 have household income information about the recipients 106, senders 102 could make mailing decisions based on this information. For example, a sender 102 may stop sending mail items 108 to recipients 106 that only make $30,000 year, but continue sending mail items 108 to $50,000 a year households, even though those households have indicated they do not want certain type of mail items 108 from the sender 102. Sender 102 may keep sending to high-income households because they are more likely to purchase something from the sender 102.

Moreover, in another embodiment, using the preference inflation, delivery service 104 may approach a certain sender 102 and offer them information about recipients 106 who have indicated a preference to receiving mail items 108 from that sender 102 or certain types of mail items 108 which that sender may offer. As a result, sender 102 may target these recipients, for example, through a new advertising campaign because sender 102 knows that these recipients 106 may be interested in the products or services of the sender 102.

Moreover, delivery service 104 may offer the preference information to senders 102 based on several factors. For example, in one embodiment, delivery service 104 may offer the filter criteria to senders 102 only if the senders 102 agree to pay delivery service 104. In another embodiment, delivery service 104 may offer the filter criteria to senders 102 free of charge. In still another embodiment, delivery service 104 may offer the filter criteria to senders 102 only after obtaining recipients consent.

Figure 4:
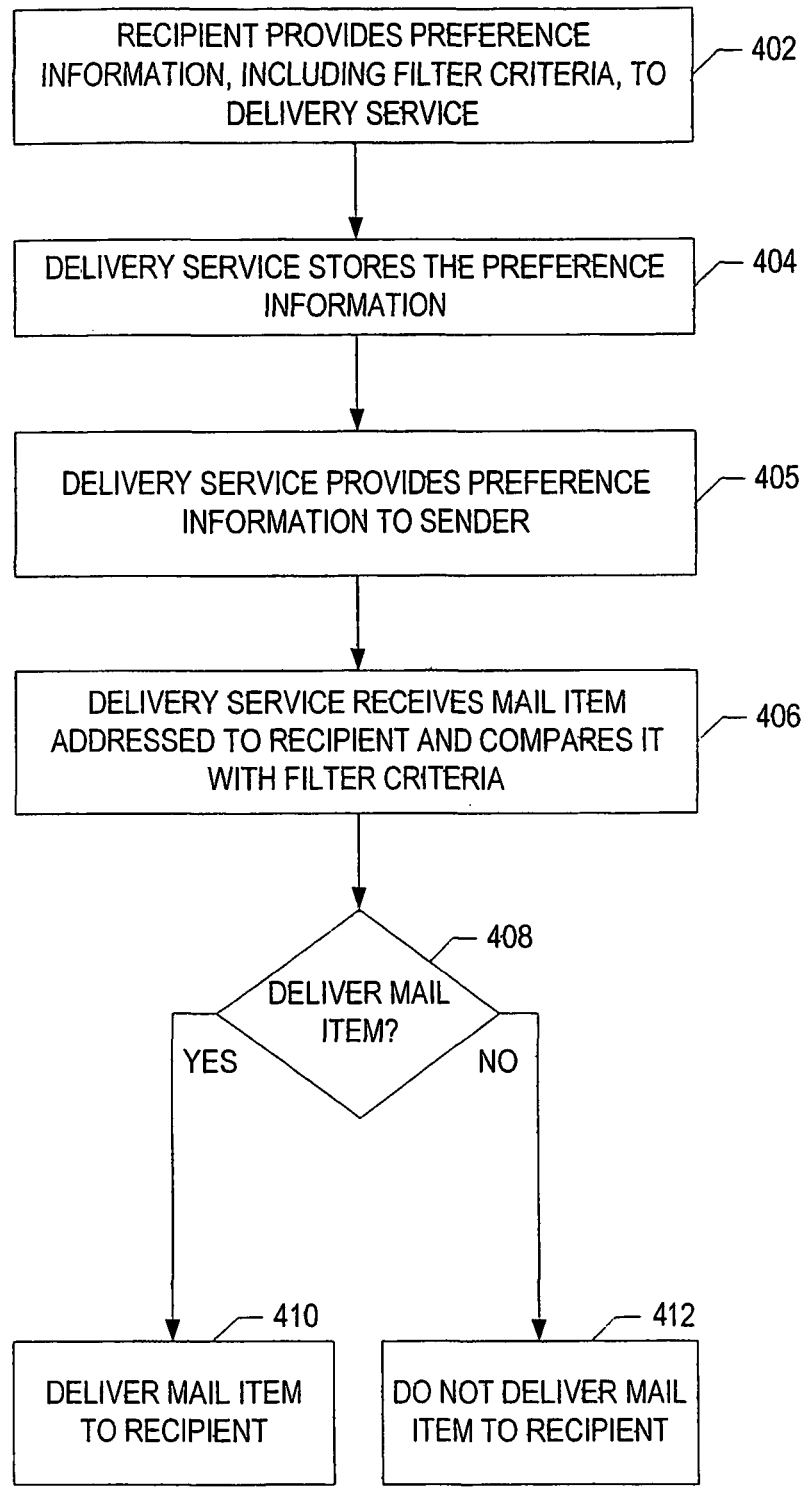
FIG. 4 is an exemplary flowchart illustrating the steps of another process for filtering mail items, in accordance with methods and systems consistent with the present invention.

Although the delivery service 104 may provide senders 102 with a recipient's preferences, senders 102 may ignore the recipient's preferences and send mail items 108 to the recipients 106 anyway. FIG. 4 is an exemplary flowchart illustrating the steps of a process for filtering mail items where the senders 102 may have ignored the recipient's preferences, in accordance with methods and systems consistent with the present invention. Steps 402, 404, 406, 408, 410, and 412 of FIG. 4 are similar to steps 202, 204, 206, 208, 210, and 212 of FIG. 2. The only difference in FIG. 4 and FIG. 2 is the addition of a new step (step 405). As a result of this step, delivery service 405 may provide part or all of the preference information to senders 102 so that the senders 102 only send mail items 108 to those recipients 106 who want mail items 108 from the sender 102 or who have at least not indicated that they do not want to receive mail items 108 from the sender 102. In this embodiment, if a sender 102 ignores the recipient's preferences and sends an unwanted mail item 108 to a recipient 106, delivery service 104 may nevertheless remove this unwanted mail item 108 from the delivery stream using the preference information of the recipient.

Although not shown in FIGS. 2-4, it will be apparent to one skilled in the art that a recipient 106 may modify the preference information, including the filter criteria, provided to delivery service 104 at anytime and that the changes may be sent to senders 102 by delivery service 104. Moreover, a delivery service 104 may or may not charge a recipient for taking out unwanted mail items 108. The charge may be a nominal fee, such as fifty cents a moth or a dollar a month.

Figure 5:
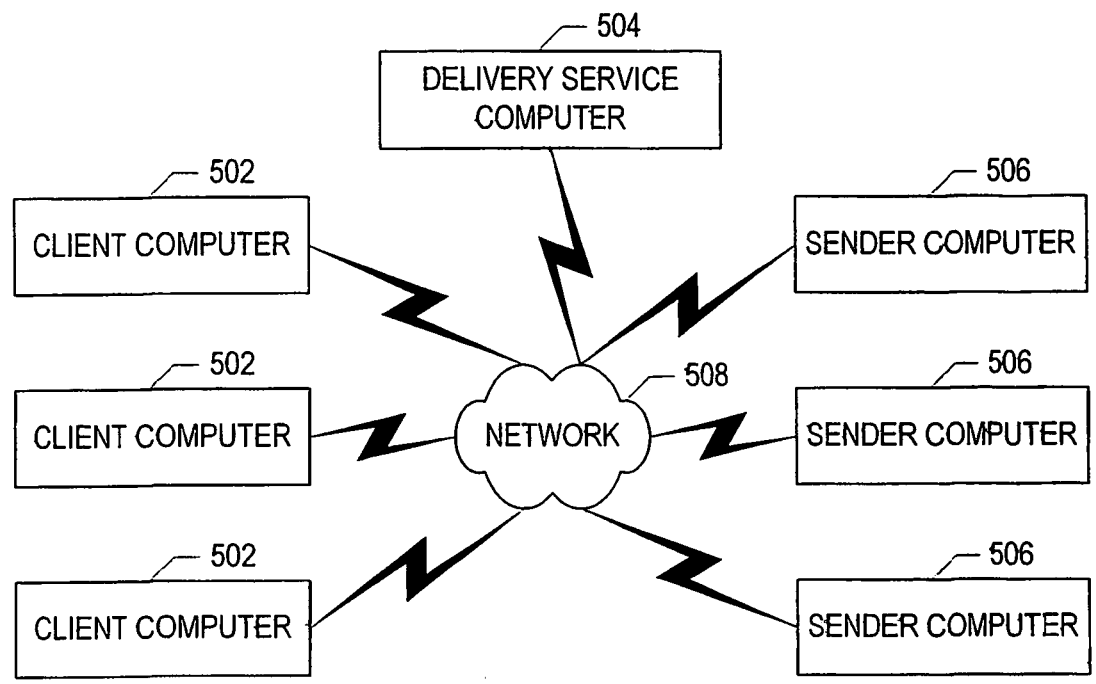
FIG. 5 is an exemplary block diagram of a system, in accordance with methods and systems consistent with the present invention.

Furthermore, it will be apparent to one skilled in the art that some or all of the steps shown in FIGS. 2-4 may be implemented electronically, for example, through the use of computers. FIGS. 5-8 illustrate such an electronic system. FIG. 5 is an exemplary block diagram of such a system 500, in accordance with methods and systems consistent with the present invention. System 500 may include one or more client computers 502, a delivery service computer 504, and one or more sender computers 506, all of which may be interconnected via a network 508.

Each client computer 502 may include a computer or any other processor capable of communicating with other computers (e.g., delivery service computer 504) and displaying information. Client computer 502 may be located at a recipient's home or at a customer service location operated by delivery service 104. Using client computer 502, a recipient 106 may send filter criteria to delivery service computer 504.

Delivery service computer 504 may include one or more computers capable of communicating with other computers (e.g., client computer 502) and displaying information. Delivery service computer 504 may be operated by a delivery service 104. Delivery service computer 504 may obtain personal information (e.g., name, address, financial information) to establish an account for a recipient 106 and may assign an account number to the recipient 106. Delivery service computer 504 may also assign logon information (e.g., user name and/or password) to a recipient 106.

In addition, delivery service computer 504 may obtain preference information, including filter criteria, from a recipient 106, may store it in a database, and may send all or parts of it to sender computer 506. Upon receipt of a mail item 108 from a sender 102, delivery service 104 may use delivery service computer 504 to read, for example, the shipping information affixed on the mail item 108, compare it to the preference information for the intended recipient 106 of mail item 108, and determine whether mail item 108 should be delivered to the recipient 106.

In accordance with an embodiment of the present invention, delivery service computer 504 may include all or some of the components shown in the registration system disclosed in U.S. patent application Ser. No. 09/809,328 ("'328 application"), filed Mar. 16, 2001, which is hereby incorporated by reference.

Sender computer 506 may include a computer or any other processor capable of communicating with other computers (e.g., delivery service computer 504) and displaying information. Sender computer 506 may receive recipient preference information, such as filter criteria, from delivery service computer 504, and may use this information to determine whether or not it should send mail items 108 to certain recipients 106. Sender computer 506 may be operated by a sender 102.

Network 508 may be a single or a combination of any type of computer network, such as a Local Area Network (LAN) or a Wide Area Network (WAN). For example, network 508 may comprise an Ethernet network operating according to the IEEE 802.3 standard. In addition, network 508 may be a combination of public (e.g., internet) and private networks.

Other system and network configurations will be apparent to those skilled in the art from the foregoing and following description, and thus, are also within the scope of the present invention. For example, it will be apparent to one skilled in the art that multiple computers may perform the tasks performed by delivery service computer 504.

Figure 6:
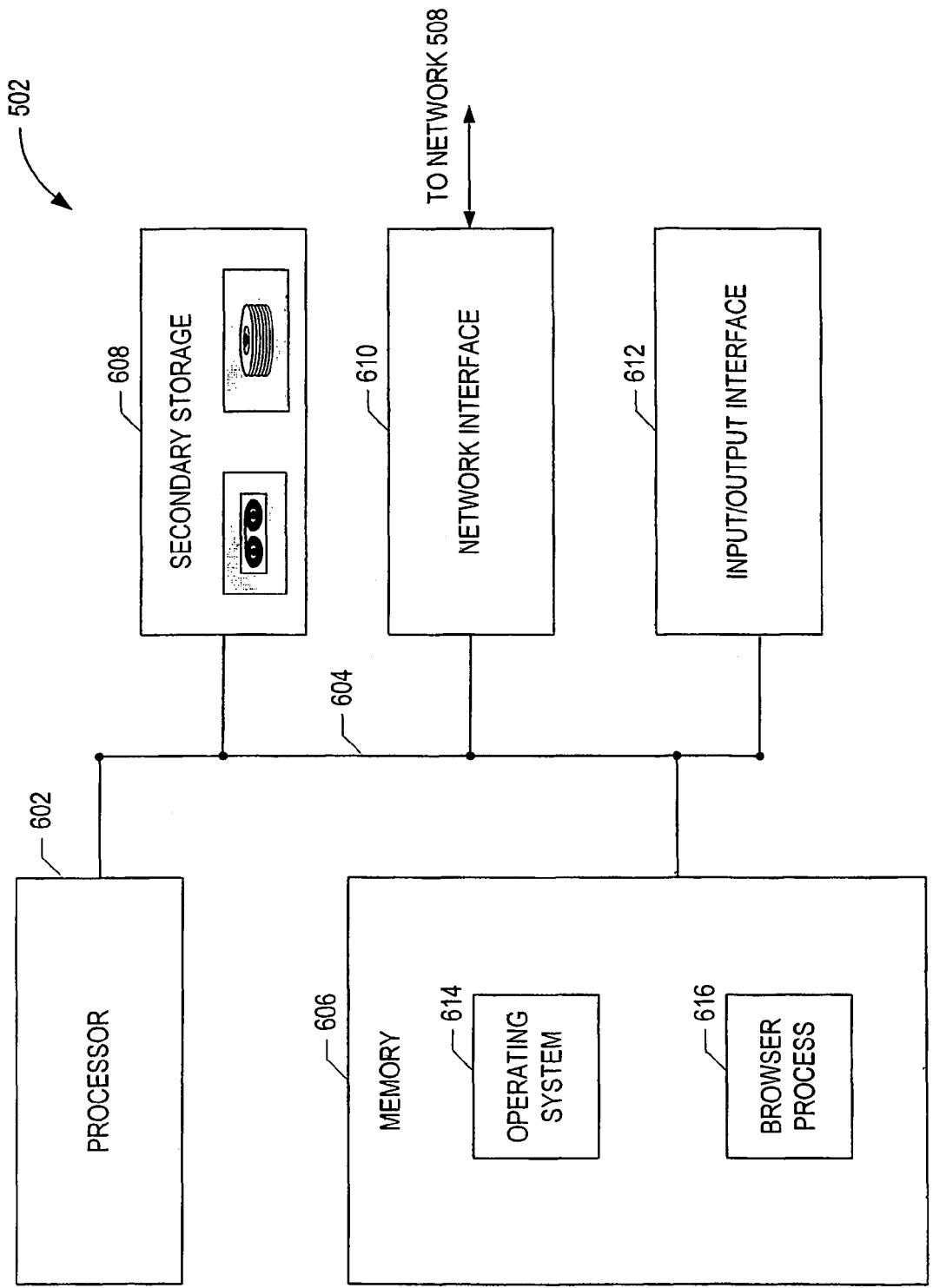
FIG. 6 is an exemplary block diagram of a client computer, in accordance with methods and systems consistent with the present invention.

FIG. 6 is an exemplary block diagram of client computer 502, in accordance with methods and systems consistent with the present invention. As shown, client computer 502 may include a processor 602, which connects via a bus 604 to a memory 606, a secondary storage 608, a network interface 610, and an input/output interface 612.

Memory 606 may include an operating system 614 and a browser process 616. Operating system 614, may include, for example, the Windows 2000 operating system available from Microsoft Corporation. Browser process 616 may include a conventional software application, such as NETSCAPE NAVIGATOR or INTERNET EXPLORER, for issuing HTTP requests to other computers (e.g., delivery service computer 504). For example, browser process 616 may request a specific web page or request other computers (e.g., delivery service computer 504) to perform a database query. Browser process 616 also may read HTML codes embedded in the web pages received from the various servers to determine how, where, and in what colors and fonts the elements on the web pages must be displayed. In another embodiment, if cellular phones are used as client computers 502, a WAP-compatible micro-browser may be used as the browser process 616. In still another embodiment, encryption capability may be included in browser process 616.

Secondary storage 608 may include a computer readable medium, such as a disk drive and a tape drive. From the tape drive, software and data may be loaded onto the disk drive, which can then be copied into memory 606. Similarly, software and data in memory 606 may be copied onto the disk drive, which can then be loaded onto the tape drive.

Network interface 610 may transmit and receive via network 508 messages addressed to client computer 502. Input/Output interface 612 may include, for example, a keyboard or a keypad and a display unit.

Figure 7:
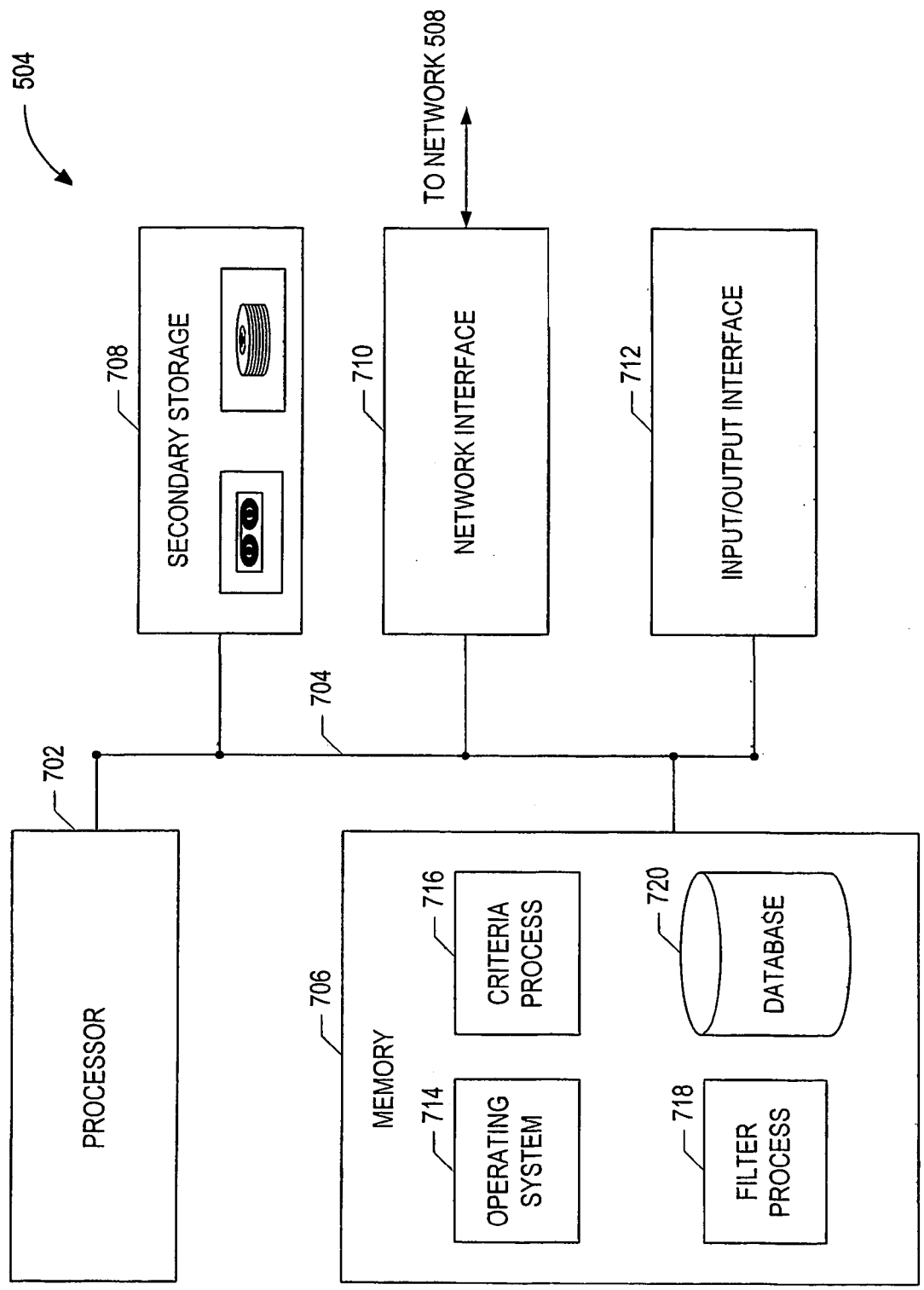
FIG. 7 is an exemplary block diagram of a delivery service computer, in accordance with methods and systems consistent with the present invention.

FIG. 7 is an exemplary block diagram of delivery service computer 504, in accordance with methods and systems consistent with the present invention. As shown, delivery service computer 504 may include a processor 702, which connects via a bus 704 to a memory 706, a secondary storage 708, a network interface 710, and an input/output interface 712.

Memory 706 may include an operating system 714, a criteria process 716, a filter process 718, and a database 720. Operating system 714 may include, for example, the Windows 2000 operating system available from Microsoft Corporation. Criteria process 716 and filter process 718 may include stored instructions in the form of software, which are executed by processor 702. Criteria process 716 may obtain preference information, including filter criteria, from a recipient 106, store it in database 720, and may send it to sender computer 506. Filter process 718 may filter mail items 108 that are received by delivery service 104 for delivery to recipients 106. Database 720 may include any type of database, such as a relational database and may include several types of information, such as preference information of recipients 106.

Secondary storage 708 may include a computer readable medium, such as a disk drive and a tape drive. From the tape drive, software and data may be loaded onto the disk drive, which can then be copied into memory 706. Similarly, software and data in memory 706 may be copied onto the disk drive, which can then be loaded onto the tape drive.

Network interface 710 may transmit and receive via network 508 messages addressed to delivery service computer 504. Input/Output interface 712 may include, for example, a keyboard or a keypad and a display unit.

It will be apparent to one skilled in the art that client computer 502 and delivery service computer 504 may include some or all of the components shown in FIGS. 6 and 7, respectively. In addition, it will be apparent to one skilled in the art that client computer 502 and delivery service computer 504 may include additional components not shown in FIGS. 6 and 7, respectively. For example, delivery service computer 504 may include an image recognition device to read information on mail items 108 and provide this information to filter process 718 for comparison to the preference information. Moreover, it will be apparent to one skilled in the art that sender computer 506 may include some or all of the components shown in FIG. 6.

The operation of system 500 will now be described. A recipient 106 may use client computer 502 to connect to delivery service computer 504 and to request filtering of mail items. For example, using client computer 502, a recipient 106 may visit a web site hosted by delivery service computer 504 and may select the option of filtering mail items from the web site. In response, criteria process 716 may request preference information, including the filter criteria, from recipient 106. After obtaining the preference information, criteria process 716 may store it in database 720. Criteria process 716 may also send all or part of the preference information to sender computers 506.

When the criteria process 716 is obtaining the preference information from a recipient 106, delivery service computer 104 may create an account for the recipient 106 and/or assign logon information to the recipient 106. The recipient may use the logon information to access other services provided by the delivery service or may use it to change preference information at a later time.

Figure 8:
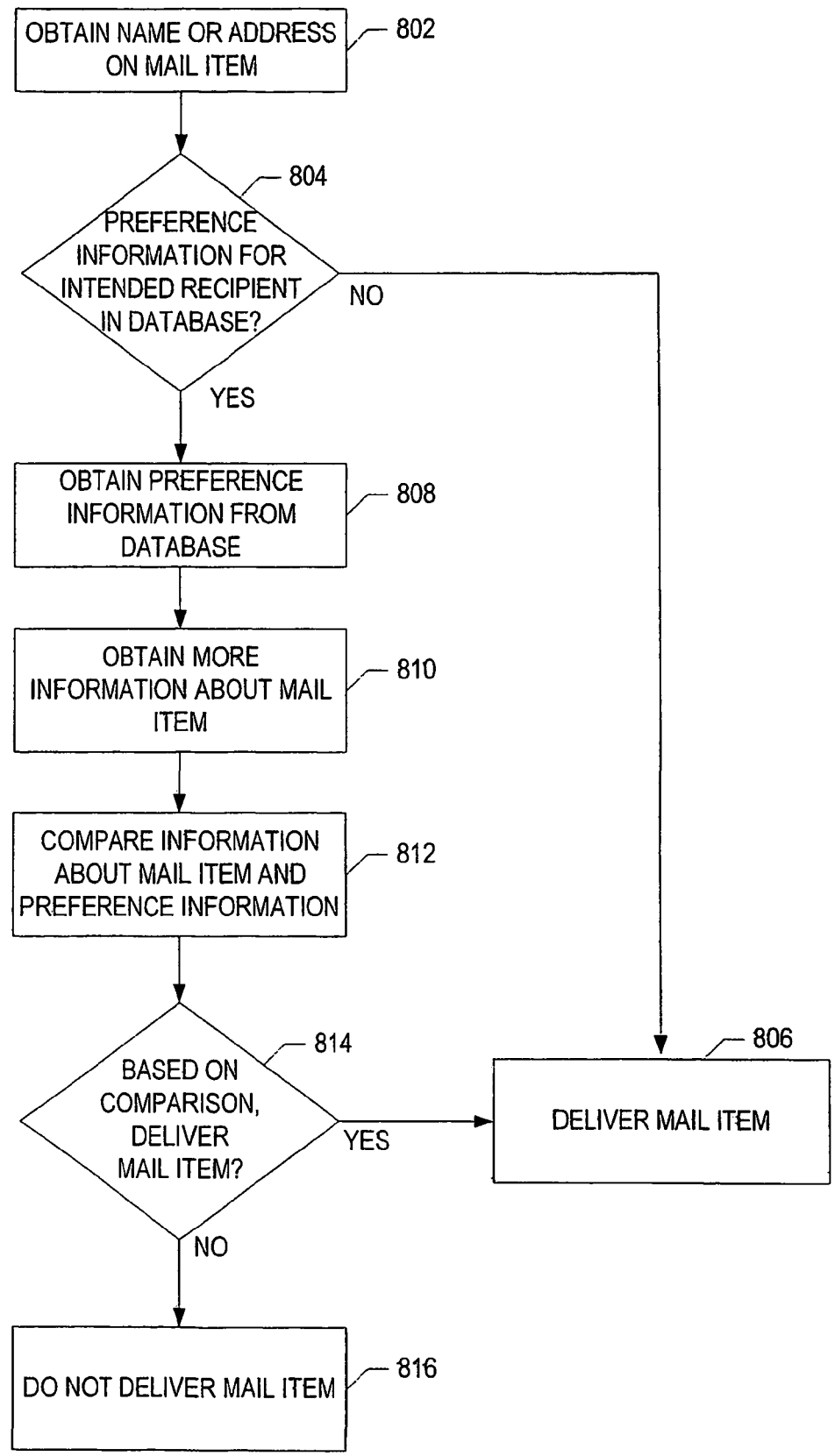
FIG. 8 is an exemplary flowchart illustrating the steps performed by a filter process, in accordance with methods and systems consistent with the present invention.

After the preference information has been stored in database 720, filter process 718 of delivery service computer 504 may use it to filter mail items 108. FIG. 8 is an exemplary flowchart illustrating the steps performed by filter process 718, in accordance with methods and systems consistent with the present invention. Upon receiving a mail item 108 that is intended for a recipient 106, filter process 718 obtains the name and/or address of the recipient 106 (step 802). In one embodiment, the sender 102 may have bar coded the recipient name and address information on mail item 108 and thus, filter process 718 may just read this barcode information and decode it. In another embodiment, filter process 718 may scan the mail item 108 to determine the name or address of the recipient 106. Any conventional scanning or image recognition mechanisms may be used to determine the name or address of the recipient.

Next, filter process 718 may query database 720 to determine if database 720 has preference information for the intended recipient 106 (step 804). For example, filter process 718 may query the database 720 to determine if there is a record for the named recipient or for the address on the mail item 108.

If there is no preference information for the intended recipient, filter process 718 may not filter out the mail item 108 and the mail item 108 may be delivered to its intended recipient 106 (step 806). On the other hand, if there is preference information for the intended recipient 106 in database 720, filter process 718 may retrieve the preference information from the database 720 (step 808).

Next, filter process 718 may obtain more information about the mail item 108 (step 810). For example, filter process 718 may obtain sender information or information about the type of the mail item, classification of the mail item, the weight of the mail item, or the size of the mail item, for example, by scanning the mail item. After obtaining more information about the mail item 108, filter process 718 may compare this information with the preference information (812) to determine if this mail item 108 should be filtered out (step 814).

If filter process 718 determines that the mail item should not be filtered out, filter process 718 may not filter out the mail item 108 and the mail item 108 may be delivered to its intended recipient 106 (steps 814 and 806). On the other hand, if filter process 718 determines that the mail item should be filtered, filter process 718 may cause delivery service computer 104, for example, to generate a label that reads "Do not deliver" (814 and 816). A representative of the delivery service 104 may place the label on the mail item 108 so that the mail item 108 is not delivered to the recipient. It will be apparent to one skilled in the art that other methods may be used to indicate that a mail item 108 should not be delivered to the recipient 106. For example, filter process 718 may flag a database on delivery service computer 504 to indicate that a certain mail item 108 should not be delivered.

The above-noted features, other aspects, and principles of the present invention may be implemented in various system or network configurations to provide automated and computational tools for filtering out mail items. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, it will be apparent to those skilled in the art that various modifications and variations can be made in the system and method of the present invention and in construction of this invention without departing from the scope or spirit of the invention.

Moreover, other embodiments of the invention will be apparent to those skilled in the art frown consideration of the specification and practice of the invention disclosed herein. It is intended that the specification and examples be considered as exemplary only, with a true scope and spirit of the invention being indicated by the following claims.

What is claimed is:

1. A computer-implemented method for filtering a physical mail item addressed to a recipient, comprising the steps performed by a processor of a computer of:
   receiving, by the processor, from the recipient, address information and recipient preference information about physical mail items, the preference information indicating the recipient's desire to receive particular mail items;
   receiving, by the processor, information about the physical mail item;
   determining, by the processor, not to deliver the physical mail item based at least on a comparison between the information about the physical mail item and the recipient preference information;
   prompting, by the processor, the recipient for instructions indicating what to do with the physical mail item after determining not to deliver the physical mail item; and
   storing, by the processor, information into a database, the information reflecting the instructions received from the recipient and indicating that the recipient does not want to receive the physical mail item from the sender.

2. The method of claim 1, wherein receiving preference information from the recipient comprises receiving preference information on at least one of a size of the physical mail items, a type of the physical mail items, a classification of the physical mail items, a weight of the physical mail items, and preference information about senders.

3. The method of claim 1, wherein receiving information about the physical mail item comprises using an image recognition device.

4. The method of claim 1, further comprising disposing of the physical mail item without delivering the item to the recipient, if the physical mail item does not match the preference information.

5. The method of claim 1, further comprising returning the physical mail item to a sender of the physical mail item without delivering the physical mail item to the recipient.

6. The method of claim 1, further comprising storing the physical mail item for delivery to the recipient upon demand in the future, if the physical mail item does not match the preference information.

7. The method of claim 1, further comprising storing the preference information in a database.

8. A computer-implemented method for determining whether to deliver a physical mail item to a recipient, comprising the steps performed by a processor of a computer of:
  receiving, by the processor, from the recipient, address information and recipient preference information about physical mail items, the preference information indicating the recipient's desire to receive particular mail items;
  receiving, by the processor, information about the physical mail item;
  determining, by the processor, not to deliver the physical mail item based at least on a comparison between the information about the physical mail item and the recipient's preference information;
  prompting, by the processor, the recipient for instructions indicating what to do with the physical mail item after determining not to deliver the physical mail item; and
  notifying, by the processor, a sender of the physical mail item that the recipient does not want to receive the physical mail item from the sender.

9. The method of claim 8, wherein sending at least part of the preference information to the sender comprises informing the sender that the recipient does not want to receive a certain physical mail item from the sender.

10. The method of claim 8, wherein sending at least part of the preference information to the sender comprises sending at least part of the preference information for a monetary charge.

11. A system for filtering a physical mail item addressed to a recipient, comprising:
  a processor; and
  a memory storing instructions executable by the processor to:
    receive, from the recipient, address information and recipient preference information about physical mail items, the preference information indicating the recipient's desire to receive particular mail items;
    obtain information about the physical mail item;
    determine not to deliver the physical mail item based at least on a comparison between the information about the physical mail item and the recipient preference information;
    prompt the recipient for instructions indicating what to do with the physical mail item after determining not to deliver the physical mail item; and
    store information into a database after determining not to deliver the physical mail item, the information reflecting the instructions received from the recipient and indicating that the recipient does not want to receive the physical mail item from the sender.

12. The system of claim 11, wherein preference information comprises at least one of a size of the physical mail items, a type of the physical mail items, a classification of the physical mail items, a weight of the physical mall items, and preference information about senders.

13. The system of claim 11, wherein the information about the physical mail item is obtained using an image recognition device.

14. A system for determining whether to deliver a physical mail item to a recipient, comprising:
  a processor; and
  a memory storing instructions executable by the processor to:
    receive, from the recipient, address information and recipient preference information about physical mail items, the preference information indicating the recipient's desire to receive particular mail items;
    obtain information about the physical mail item;
    determine not to deliver the physical mail item based at least on a comparison between the information about the physical mail item and the recipient's preference information;
    prompt the recipient for instructions indicating what to do with the physical mail item after determining not to deliver the physical mail item; and
    notify a sender of the physical mail item that the recipient does not want to receive the physical mail item from the sender, after determining not to deliver the physical mail item.

15. A non-transitory computer-readable storage medium containing instructions for causing a computer to perform a method for filtering a physical mail item addressed to a recipient, the method comprising:
  receiving, from the recipient, address information and recipient preference information about physical mail items, the preference information indicating the recipient's desire to receive particular mail items;
  obtaining information about the physical mail item;
  determining not to deliver the physical mail item based at least on a comparison between the information about the physical mail item and the recipient preference information;
  prompting the recipient for instructions indicating what to do with the physical mail item after determining not to deliver the physical mail item; and
  storing information into a database, the information reflecting the instructions received from the recipient and indicating that the recipient does not want to receive the physical mail item from the sender.

16. A non-transitory computer-readable storage medium containing instructions for causing a computer to perform a method for determining whether to deliver a physical mail item to a recipient, the method comprising:
  receiving, from the recipient, address information and recipient preference information about physical mail items, the preference information indicating the recipient's desire to receive particular mail items;
  obtaining information about the physical mail item;
  determining not to deliver the physical mail item based at least on a comparison between the information about the physical mail item and the recipient's preference information;
  prompting the recipient for instructions indicating what to do with the physical mail item after determining not to deliver the physical mail item; and notifying a sender of the physical mail item that the recipient does not want to receive the physical mail item from the sender.

17. The method of claim 1, wherein the information about the physical mail item comprises a classification of the physical mail item, the classification indicating whether the physical mail item is a bulk-class mail item.

18. The method of claim 8, the information about the physical mail item comprises a classification of the physical mail item, the classification indicating whether the physical mail item is a bulk-class mail item.

19. The system of claim 11, wherein the information about the physical mail item comprises a classification of the physical mail item, the classification indicating whether the physical mail item is a bulk-class mail item.

20. The system of claim 14, wherein the information about the physical mail item comprises a classification of the physical mail item, the classification indicating whether the physical mail item is a bulk-class mail item.

21. The computer-readable storage medium of claim 15, wherein the information about the physical mail item comprises a classification of the physical mail item, the classification indicating whether the physical mail item is a bulk-class mail item.

22. The computer-readable storage medium of claim 16, wherein the information about the physical mail item comprises a classification of the physical mail item, the classification indicating whether the physical mail item is a bulk-class mail item.

23. The method of claim 8, wherein obtaining information about the physical mail item comprises using an image recognition device.

24. The system of claim 14, wherein the information about the physical mail item is obtained using an image recognition device.

25. The computer-readable storage medium of claim 15, wherein obtaining information about the physical mail item comprises using an image recognition device.

26. The computer-readable storage medium of claim 16, wherein obtaining information about the physical mail item comprises using an image recognition device.

27. The method of claim 1, further comprising:
providing, to a sender, a list of recipients that do not wish to receive physical mail items from the sender.

28. The method of claim 1, further comprising:
generating, using the preference information, a list of recipients that do not wish to receive physical mail items from a sender.

29. The method of claim 1, further comprising:
notifying a sender of the preference information.

30. The method of claim 8, further comprising:
providing, to a sender, a list of recipients that do not wish to receive physical mail items from the sender.

31. The method of claim 8, further comprising:
generating, using the preference information, a list of recipients that do not wish to receive physical mail items from a sender.

32. The method of claim 8, further comprising:
notifying a sender of the preference information.

33. The system of claim 11, wherein the instructions are further executable by the processor to:
provide, to a sender, a list of recipients that do not wish to receive physical mail items from the sender.

34. The system of claim 11, wherein the instructions are further executable by the processor to:
generate, using the preference information, a list of recipients that do not wish to receive physical mail items from a sender.

35. The system of claim 11, wherein the instructions are further executable by the processor to:
notify a sender of the preference information.

36. The system of claim 14, wherein the instructions are further executable by the processor to:
provide, to a sender, a list of recipients that do not wish to receive physical mail items from the sender.

37. The system of claim 14, wherein the instructions are further executable by the processor to:
generate, using the preference information, a list of recipients that do not wish to receive physical mail items from a sender.

38. The system of claim 14, wherein the instructions are further executable by the processor to:
notify a sender of the preference information.

39. The computer-readable storage medium of claim 15, the method further comprising:
providing, to a sender, a list of recipients that do not wish to receive physical mail items from the sender.

40. The computer-readable storage medium of claim 15, the method further comprising:
generating, using the preference information, a list of recipients that do not wish to receive physical mail items from a sender.

41. The computer-readable storage medium of claim 15, the method further comprising:
notifying a sender of the preference information.

42. The computer-readable storage medium of claim 16, the method further comprising:
providing, to a sender, a list of recipients that do not wish to receive physical mail items from the sender.

43. The computer-readable storage medium of claim 16, the method further comprising:
generating, using the preference information, a list of recipients that do not wish to receive physical mail items from a sender.

44. The computer-readable storage medium of claim 16, the method further comprising:
notifying a sender of the preference information.

* * * * *